(12) United States Patent
Kapoor et al.

(10) Patent No.: US 7,228,494 B2
(45) Date of Patent: Jun. 5, 2007

(54) METHODS AND SYSTEMS FOR PROVIDING NAVIGATION WITHIN AN APPLICATION

(75) Inventors: Sanjay Kapoor, Punjab (IN); Sriram Sridharan, Karnataka (IN)

(73) Assignee: SAP AG, Walldorf (DE)

( * ) Notice: Subject to any disclaimer, the term of this patent is extended or adjusted under 35 U.S.C. 154(b) by 480 days.

(21) Appl. No.: 10/799,764

(22) Filed: Mar. 15, 2004

(65) Prior Publication Data

US 2005/0203925 A1    Sep. 15, 2005

(51) Int. Cl.
 *G06F 17/00*    (2006.01)
(52) U.S. Cl. ...................... 715/512; 715/500
(58) Field of Classification Search ............... 707/100, 707/1, 501, 512; 715/500–513; 345/779, 345/781
See application file for complete search history.

(56) References Cited

U.S. PATENT DOCUMENTS

| 6,072,486 | A | * | 6/2000 | Sheldon et al. | ............. | 715/835 |
| 6,751,777 | B2 | * | 6/2004 | Bates et al. | ............. | 715/501.1 |
| 6,760,746 | B1 | * | 7/2004 | Schneider | ................... | 709/203 |
| 6,781,611 | B1 | * | 8/2004 | Richard | ...................... | 715/779 |
| 6,865,713 | B1 | * | 3/2005 | Bates et al. | ................. | 715/512 |

* cited by examiner

*Primary Examiner*—Don Wong
*Assistant Examiner*—Hung T Vy
(74) *Attorney, Agent, or Firm*—Mintz, Levin, Cohn, Ferris, Glovsky and Popeo, P.C.

(57) ABSTRACT

Systems and methods for providing navigation in an application may have a menu system that allow a user to see a menu with options for most or all of the possible navigable contexts without first displaying an intermediate context. A user may then go directly to a desired context rather than taking a circuitous route via intermediate contexts.

24 Claims, 7 Drawing Sheets

METHODS AND SYSTEMS FOR PROVIDING NAVIGATION WITHIN AN APPLICATION

TECHNICAL FIELD

This invention relates generally to methods and systems for providing navigation within an application, and more specifically to methods and systems for providing navigation within an application that do not force a user to view undesired intermediate contexts.

BACKGROUND

Within an application, hyperlinks allow a user to navigate from one business view to another. A target business view may or may not belong to a source business context. A context comprises a visual display of data according to the user's current needs. A hyperlink, comprising a predefined linkage between objects in the application, may be displayed as text, an icon, or some other user-selectable elements. With Internet web pages, for example, a text hyperlink may appear as underlined text, while a graphical hyperlink may appear as a small image. A context and the data source used to produce it are often modeled during the application's design and may not be changed at run time.

FIGS. 1 and 2 are screen shots of conventional displays with conventional menu systems. An activity business view 100 displays details of an activity for a business partner 105 "Becker Berlin." Upon execution (left mouse click, for example), a details hyperlink 110 navigates the application to a pre-defined view with business context 200 (FIG. 2), displaying a pre-defined view within business context 200. In addition, executing details hyperlink 110 also obtains data from the application and supplies the data to business partners context 200 for display.

With such conventional systems, a user may have to follow a long route to reach a desired business context view within a target business context following a hyperlink execution. For example, if a user viewing the activity business context 100 of FIG. 1 wanted to view the "sales area data" business view of "business partner" business context, the user must first navigate to business partners context 200, where the user can access sales area data hyperlink 205 in navigation menu 210. Then, the user may execute hyperlink 205 and display the desired "sales area data" business view. In the conventional menu systems of FIG. 1 and FIG. 2, the user is not exposed to other possible semantically peer business views in the target business contexts, such as those shown in navigation menu 210, unless the user first navigates to an intermediate context, such as business partners context 200. This intermediate view, however, may be unimportant to the user.

SUMMARY

A system consistent with the present invention includes a memory storage for maintaining an internal data structure in a context for display database and a processing unit coupled to the memory storage. The processing unit may receive a first data input, use meta-data, the meta-data corresponding to a primary process within the application for displaying a plurality of contexts for display data, to determine the plurality of contexts for display data associated with the first data input, and provide, prior to displaying any of the plurality of contexts for display data, a plurality of second user-selectable elements, each one of the plurality of second user-selectable elements associated with a different one of the plurality of contexts for display data.

A method consistent with the present invention includes receiving a first data input, using meta-data, the meta-data corresponding to a primary process within the application for displaying a plurality of contexts for display data, to determine the plurality of contexts for display data associated with the first data input, and providing, prior to displaying any of the plurality of contexts for display data, a plurality of second user-selectable elements, each one of the plurality of second user-selectable elements associated with a different one of the plurality of contexts for display data.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings show features of implementations consistent with the present invention and, together with the corresponding written description, help explain principles associated with the invention. In the drawings:

FIG. 1 is a screen shot of a display consistent with a conventional menu system;

FIG. 2 is another screen shot of a display consistent with a conventional menu system;

FIG. 7 is yet another screen shot of a display menu system consistent with the invention.

DETAILED DESCRIPTION

Figure 3:
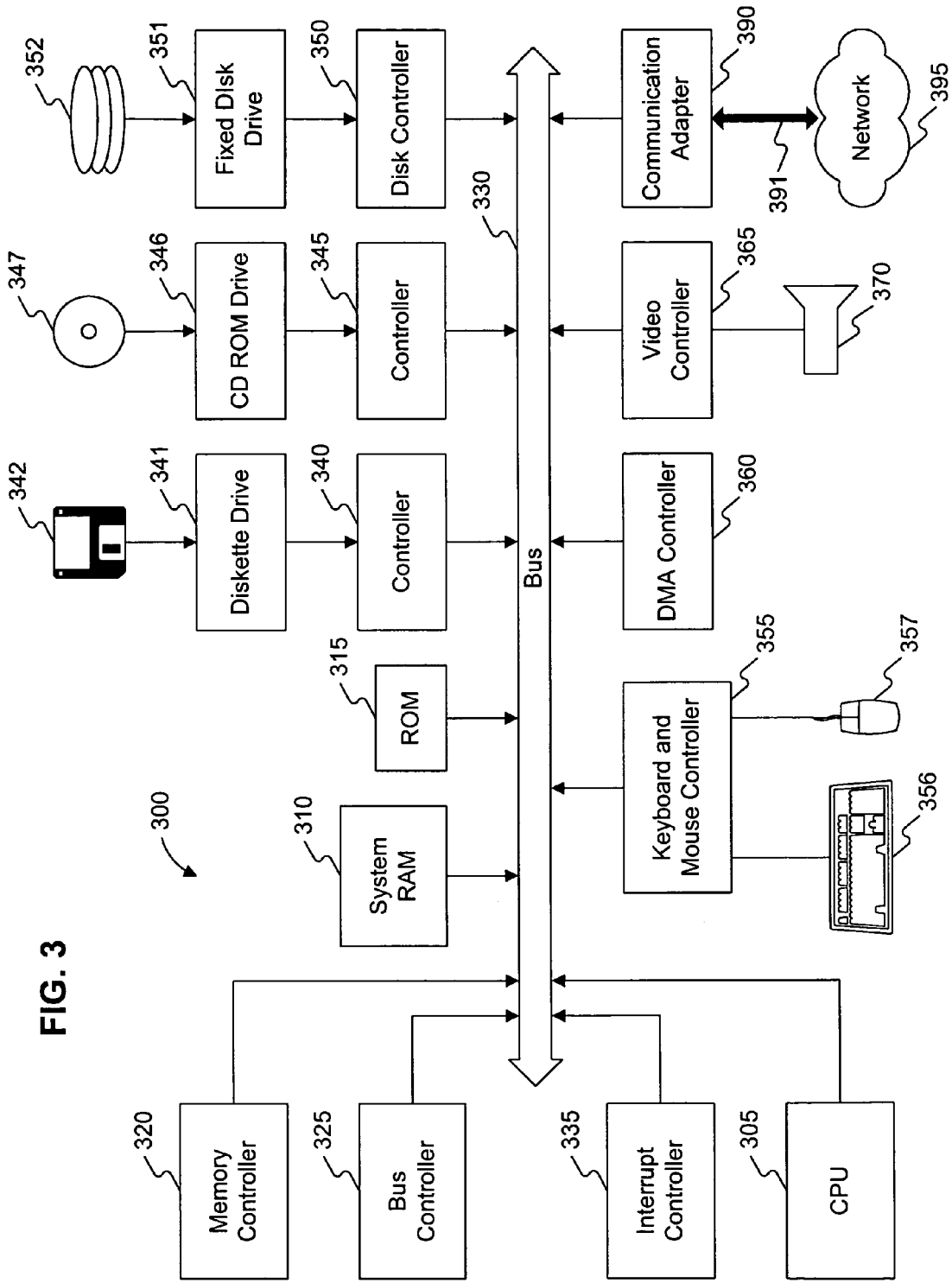
FIG. 3 is a functional block diagram of a computer system consistent with the invention.

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of such systems and methods.

In the following, business context may comprise an entity that aggregates various semantically related business views on a Business Entity. For example, activity business context may aggregate the following business views: search; details; and calendar. All of these views may display different details about the business entity's Activity, for example. Business view may display details about a business entity. A hyperlink may have a pre-defined target business view within a target business context. A target business view may comprise a business view that is modeled as a target of a hyperlink at design time. In addition, target business context may comprise a business context to which the target business view belongs.

Exposing a user to "smart options" for navigation may enhance navigation capabilities of an application. The logic in these smart options may use meta-data associated with business-context hierarchical views in an application associated with a primary menu system. For example, an application may include a primary menu system that forces a user to navigate to certain predefined intermediate contexts before providing a menu with options corresponding to other available contexts.

Consistent with the invention, the application may also include an alternate menu system that can expose the user to navigational options that allow the user to see a menu with options corresponding to other possible business views within target business context without first forcing the user to an intermediate modeled business view. The user may choose an alternate menu option and go directly to a desired business view rather than adopting the primary menu system's circuitous route.

The primary menu system may remain unaffected by the existence of the alternate menu system. For example, upon performing a default operation, a left mouse click for example, the application may run the primary menu system. Performing an alternate operation, a right mouse click for example, may activate the alternate menu system without affecting the primary menu system.

Consistent with the invention, a system for providing navigation in an application may comprise a memory storage for maintaining an internal data structure in a context for display database and a processing unit coupled to the memory storage. The contexts for display database may contain formatting data for the various contexts, data to be displayed in the various contexts, and meta-data for the primary menu system associating a hierarchy for the various contexts.

The processing unit may receive a first data input and determine contexts for display data associated with that input using the meta-data. The processing unit may also provide second user-selectable elements before displaying any of the contexts for display data. Each of the second user-selectable elements may be associated with a different business view within target business context.

The memory storage and processing unit may be part of a computer system 300, as shown in FIG. 3. Computer system 300 is exemplary only, and its design is not critical to this invention.

FIG. 3 is a functional block diagram of a computer system 300. Although the description may refer to terms commonly used in describing particular computer systems, such as a personal computer, the description and concepts equally apply to other computer systems, such as network computers, workstations, and even mainframe computers having architectures dissimilar to FIG. 3.

Computer system 300 includes a central processing unit (CPU) 305, which may be implemented with a conventional microprocessor, a random access memory (RAM) 310 for temporary storage of information, and a read only memory (ROM) 315 for permanent storage of information. A memory controller 320 controls RAM 310.

A bus 330 interconnects the components of computer system 300. A bus controller 325 controls the bus 330. An interrupt controller 335 receives and processes various interrupt signals from the system components.

Mass storage may be provided by diskette 342, CD ROM 347, or hard drive 352. Data and software may be exchanged with computer system 300 via removable media such as diskette 342 and CD ROM 347. Diskette 342 inserts into diskette drive 341, which in turn connects to bus 330 via a controller 340. Similarly, CD ROM 347 inserts into CD ROM drive 346, which in turn connects to bus 330 via controller 345. Hard disk 352 is part of a fixed disk drive 351 that connects to bus 330 by controller 350. Any of computer system 300's memory devices may contain the aforementioned contexts for display database and software modules for implementations consistent with the invention.

User input to computer system 300 may be provided by a number of devices. For example, a keyboard 356 and mouse 357 connect to bus 330 via controller 355. In addition, other input devices, such as a pen, a tablet, or speech-recognition mechanisms, may connect to bus 330 and an appropriate controller and software. A direct memory access (DMA) controller 360 performs direct memory access to RAM 310. A video controller 365 that controls video display 370 may generate user output.

Computer system 300 also includes a communications adaptor 390 that allows the system to be interconnected to additional computing resources via a local area network (LAN) or a wide area network (WAN), such as the Internet, schematically illustrated by bus 391 and network 395, respectively. Signals traveling through network 395 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operating system software controls and coordinates computer system 300. In particular, the operating system controls allocation of system resources and performs tasks, such as memory management, process scheduling, networking, and services, among other things.

Figure 4:
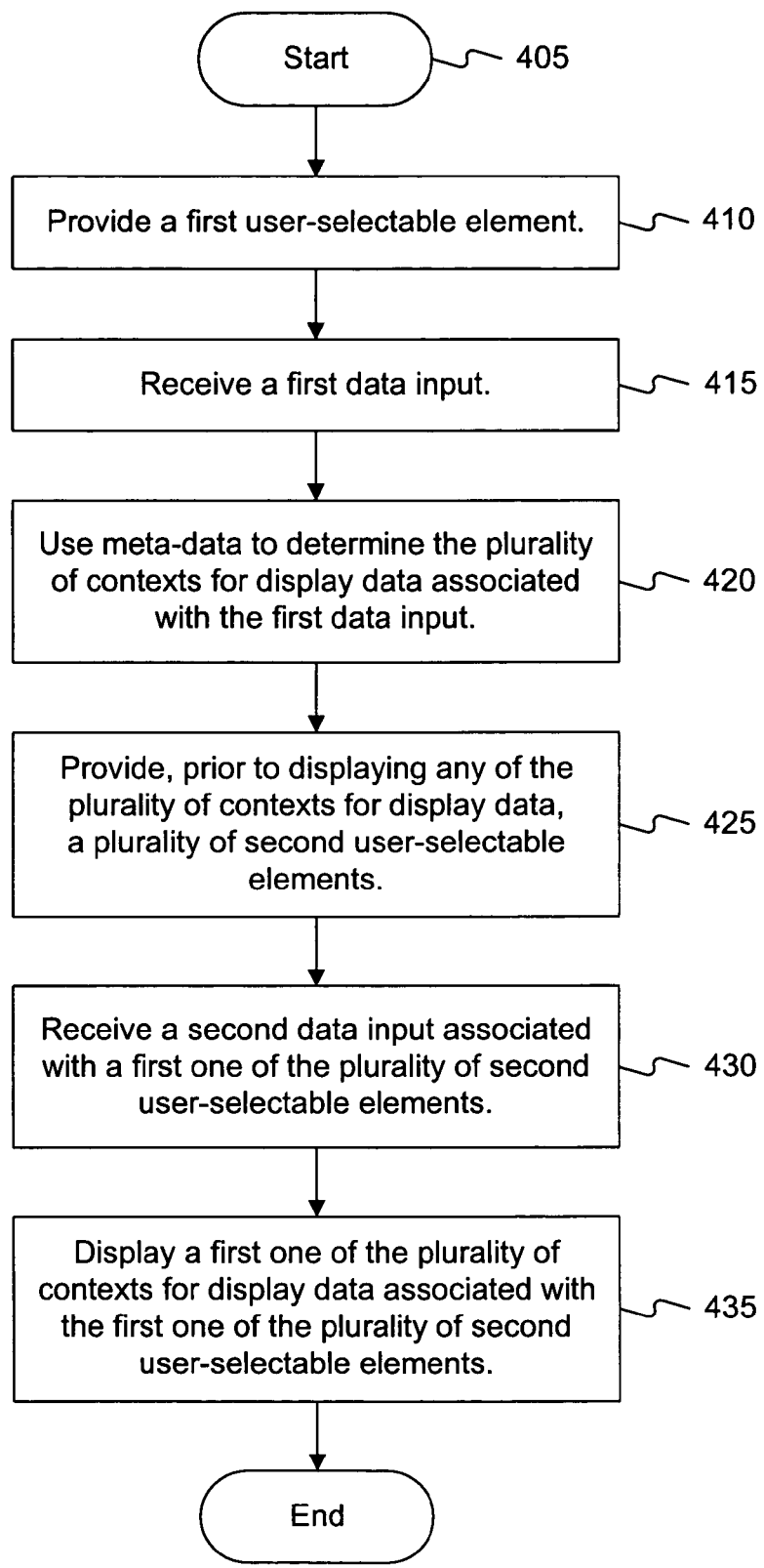
FIG. 4 is a flow chart setting forth the general stages of a method for providing navigation within an application consistent with the invention.
Figure 5:
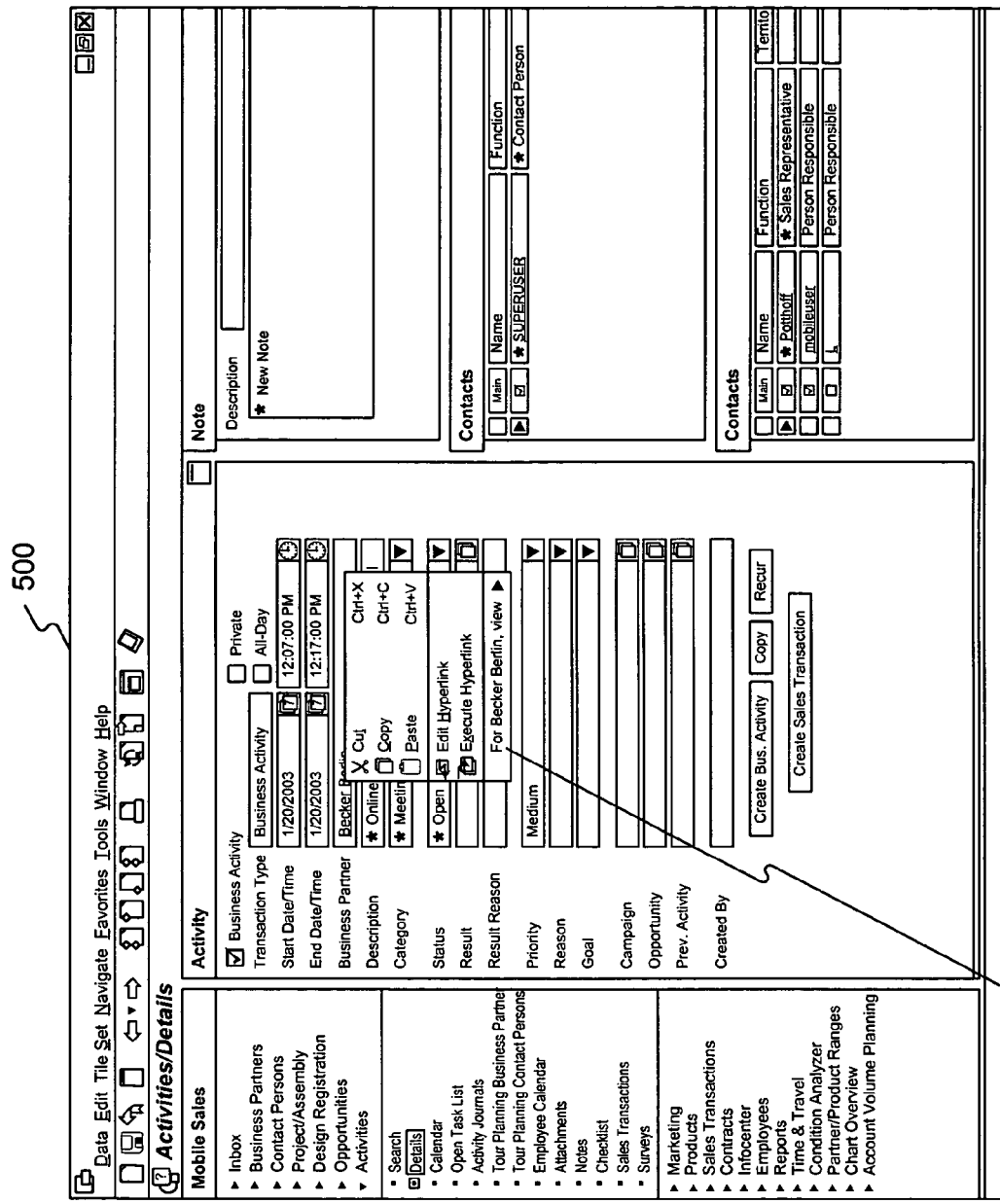
FIG. 5 is a screen shot of a display menu system consistent with the invention.

FIG. 4 is a flow chart setting forth stages involved in a method 400 for providing navigation in an application consistent with the invention. After beginning (stage 405), computer system 300 provides a first user-selectable element (stage 410). The first user-selectable element may comprise icon 505 and may be associated with business context 500 (FIG. 5) on video display 370. However, icon 505 may be suppressed by, for example, an application running the alternate menu system.

Next, computer system 300 receives a first data input that may be associated with the first user-selectable element (stage 415). A user may initiate the first user-selectable element (e.g., icon 505) using keyboard 356 or mouse 357 to cause computer system 300 to receive the associated data input. Initiating the first user-selectable element also allows the user to invoke an alternate menu system.

In response to the data input, computer system 300 determines the alternate navigational options. Each of the navigational options corresponds to a sibling business view of the modeled target business view. In order to achieve this, first the modeled target business view is determined from the user interface meta data. Once this is known, the parent business context (which is same as target business context) is determined using user interface meta data. For the business context thus determined, all of the child business views are enumerated and displayed as alternate "smart options" for alternate navigation. The labels for each of these options is same as captions used in primary menu system (210) and is obtained from user interface meta data.

The meta data used for determining these options is same as the meta data used to construct the primary menu/navigation system (210).

Figure 1:
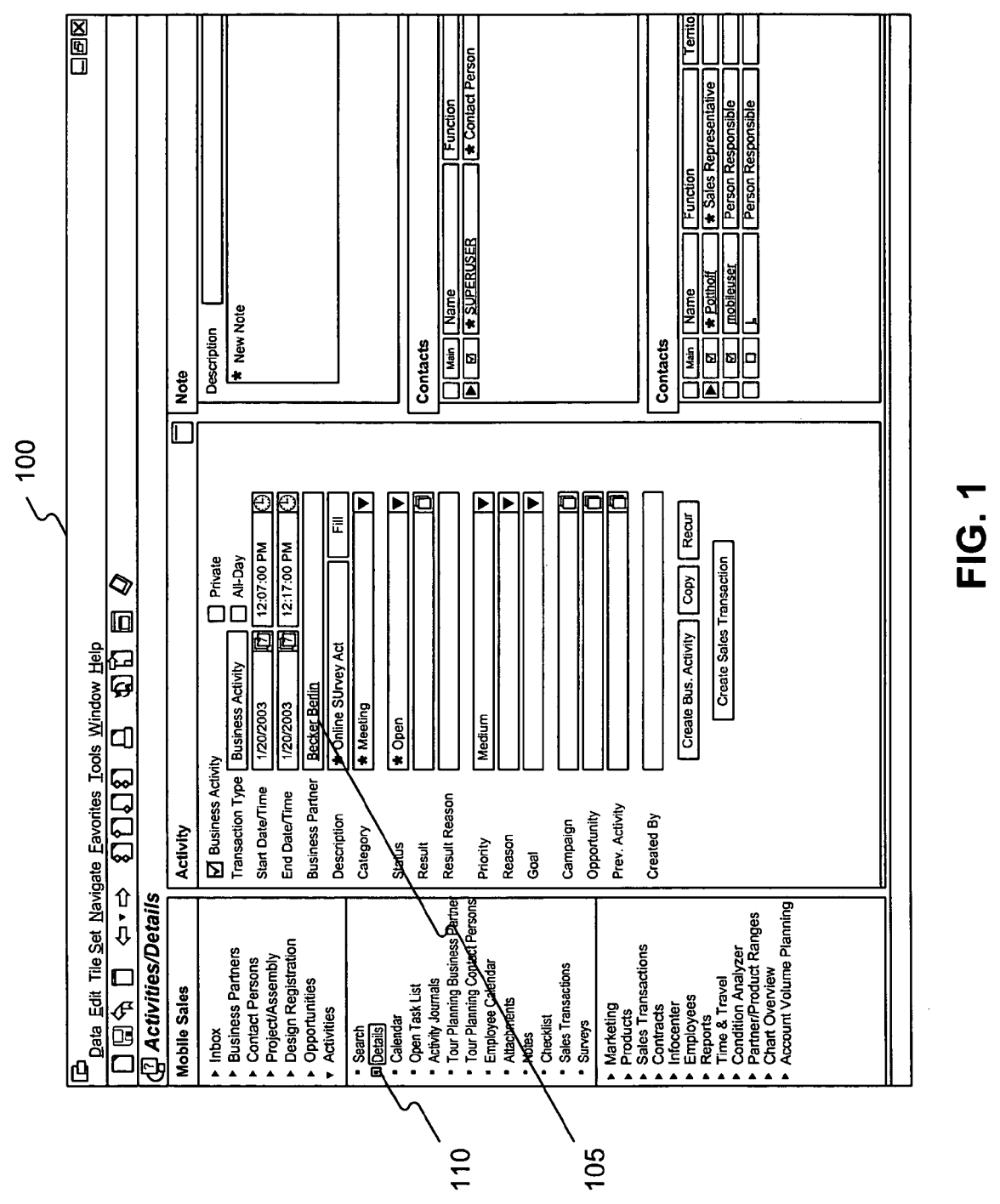
Figure 2:
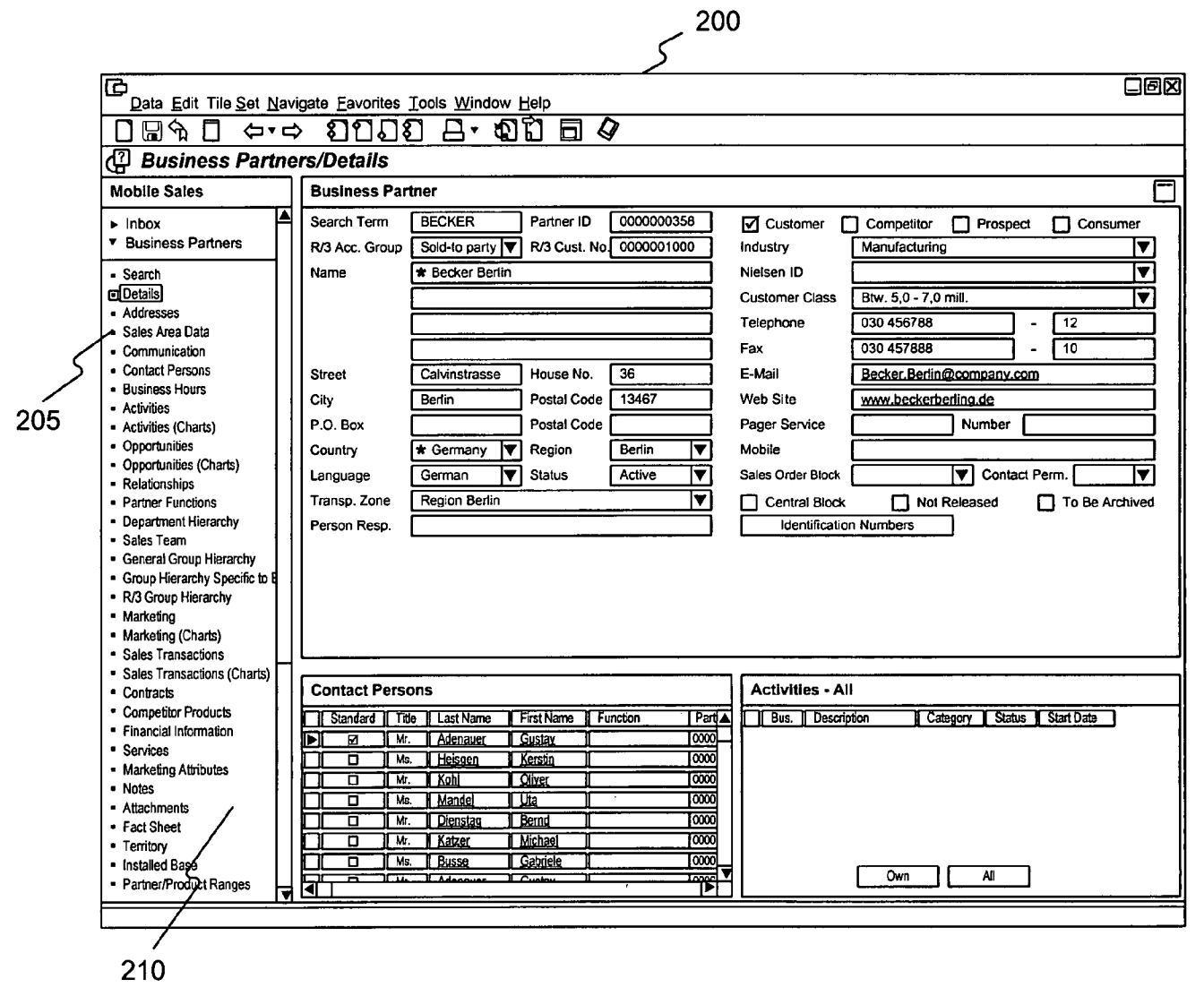

The primary menu system of FIGS. 1 and 2 may provide additional user-selectable elements associated with a different context for display data. For example, the additional user-selectable elements may comprise hyperlinks in navigation menu 210 of FIG. 2.

Figure 6:
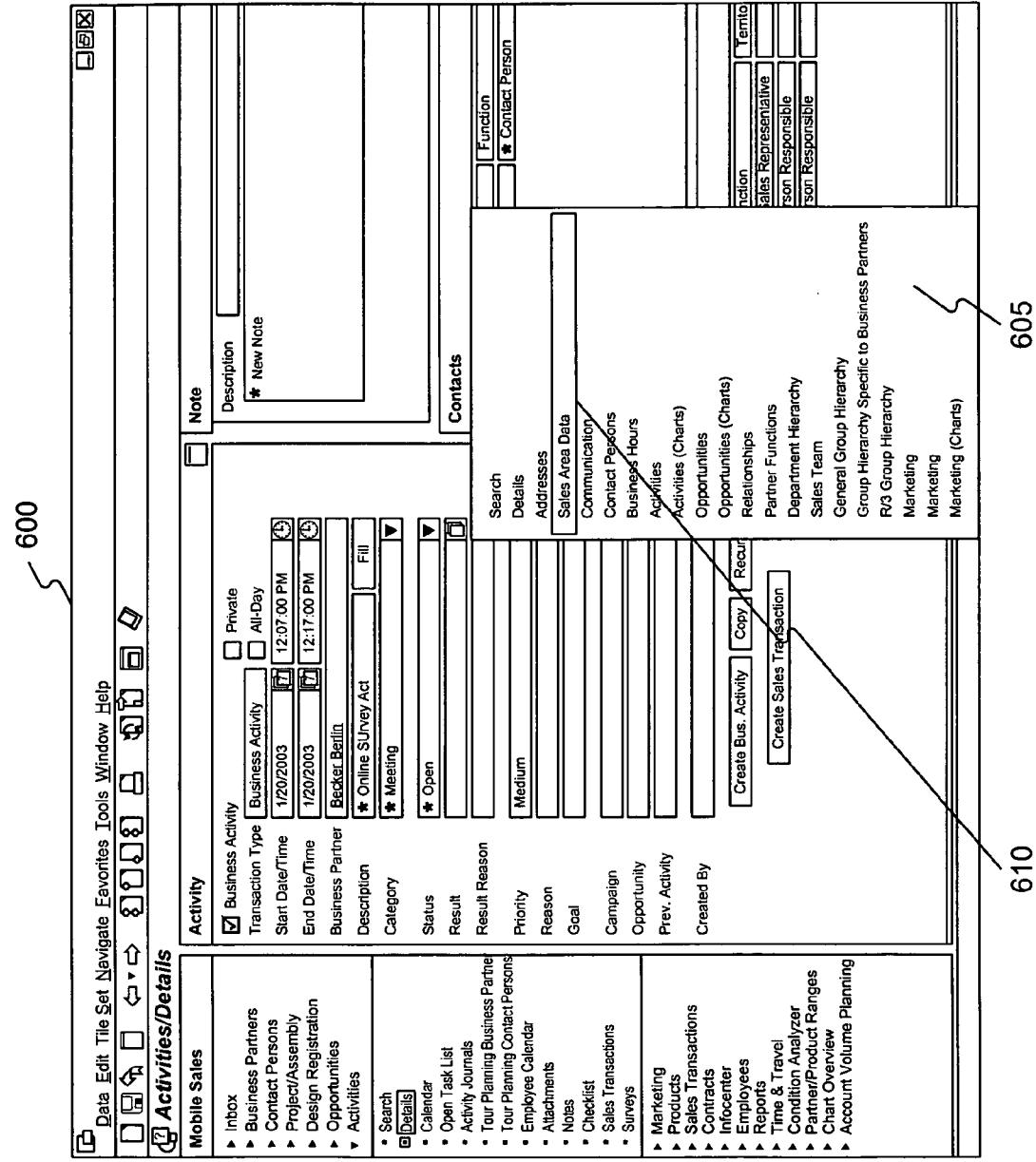
FIG. 6 is another screen shot of a display menu system consistent with the invention.

Computer system 300 next provides, prior to displaying any of the plurality of contexts for display data, a plurality of second user-selectable elements (stage 425). For example, computer system 300 may provide, context 600 shown in FIG. 6, in which the user-selectable elements comprise the hyperlinks in menu 605. Furthermore, the user-selectable elements may also correspond to hyperlinks within navigation menu 210 of FIG. 2.

Computer system 300 next receives a second data input associated with a first one of the plurality of second user-selectable elements (stage 430). The second data input may come from keyboard 356 or mouse 357, and may select any one of the lines in menu 605. When the user provides this input to initiate a corresponding user-selectable element, computer system 300 may invoke a particular business view. For example, if the user selects hyperlink 610 from menu 605, computer system 300 may invoke a business view associated with sales area data.

Figure 7:
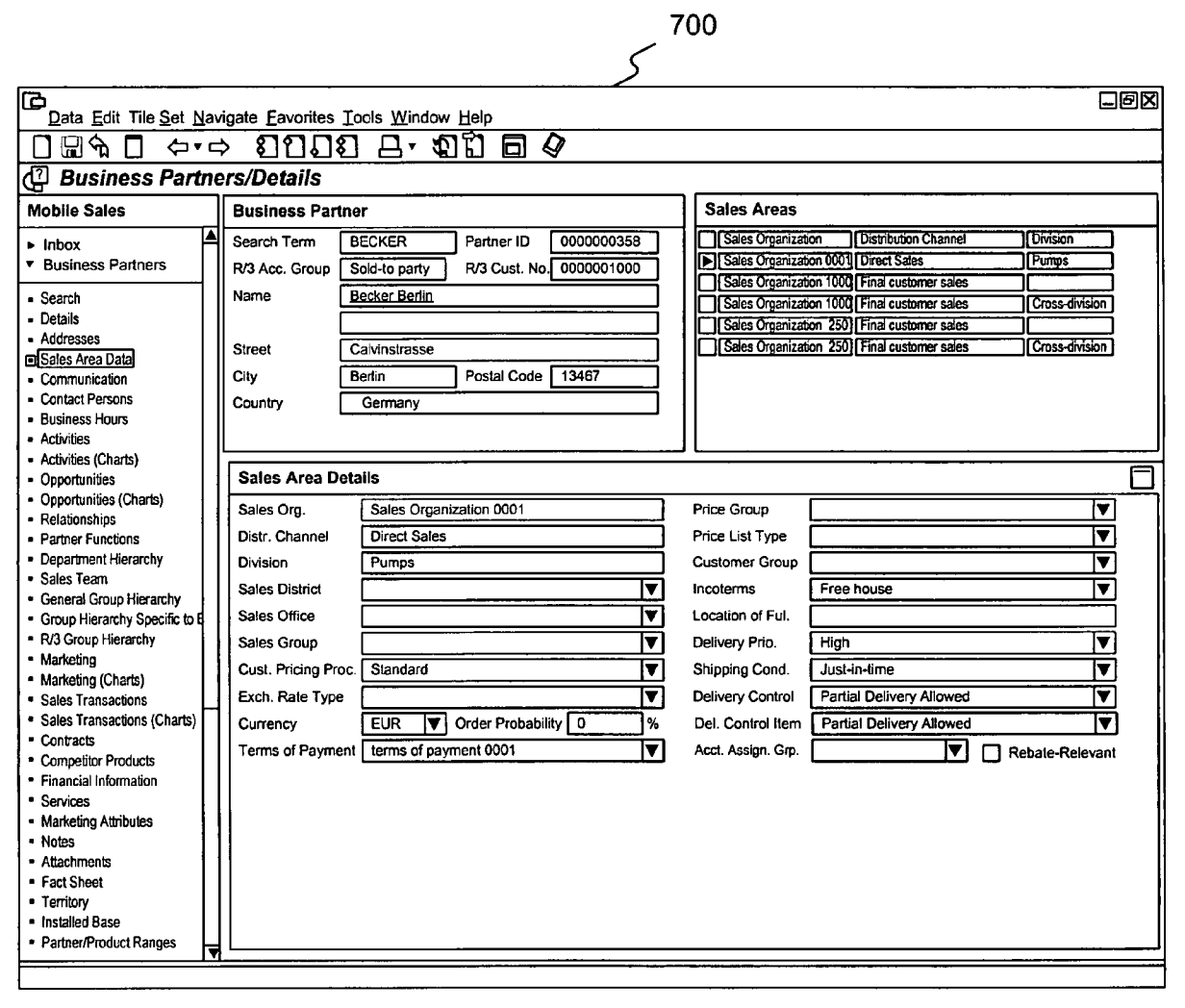

Once computer system 300 receives the second data input associated with the first one of the plurality of second user-selectable elements, computer system 300 invokes a particular business view (stage 435). For example, if the user selected hyperlink 610, computer system 300 may display context 700 (FIG. 7) corresponding to sales area data. This allows the user to navigate directly to the desire sales area data context without having to display an intermediate context such as business partners context 200 of FIG. 2, which may be unimportant to the user.

Consistent with the invention, a programmer may exclude some options from smart options that appear in a context menu. This may be done by design time support. A programmer may suppress these smart options for any hyperlink, for example, by appropriately coding in relevant user exits specific to those hyperlinks. For example, if these options were to be suppressed for a hyperlink, the programmer can set some value to some property in an event handler to avoid these smart option from appearing. In such a case Smart Hyperlinks may act as Ordinary Hyperlinks.

The foregoing description of possible implementations consistent with the present invention does not represent a comprehensive list of all such implementations or all variations of the implementations described. For example, there has been little discussion of the technology for implementing the system in FIG. 3 because the technology is not critical to this invention, and the technology can be anything appropriate to the implementation. The description of only some implementations should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations is essential to the invention.

What is claimed is:

1. A method for providing navigation within an application, the application comprising a plurality of application contexts, each application context having a predefined set of application views capable of being displayed to a user of the application, the method comprising:
   receiving a first data input from the user of the application, the first data input corresponding to a first application view selected by the user;
   determining a target application context whose predefined set of application views includes the first application view selected by the user;
   displaying prior to displaying the first application view selected by the user, a plurality of user-selectable elements associated with one or more application views in the target application contest;
   receiving a second data input from the user, the second data input corresponding to a user-selectable element selected by the user and associated with a second application view in the target application context; and
   displaying, the response to receiving the second data input, the second application view to the user without first displaying the first application view.

2. The method of claim 1, further comprising providing a first user-selectable element prior to receiving the first data input.

3. The method of claim 2, further comprising associating the first data input with the first user-selectable element.

4. The method of claim 1, further comprising:
   using meta-data to determine the target application context whose predefined set of application views includes the first application view selected by the user.

5. The method of claim 4, wherein the meta-data is stored in a database.

6. The method of claim 5, wherein the database is further configured to store at least one of formatting data for the plurality of application contexts and data to be displayed in the plurality of application contexts.

7. The method of claim 4, wherein the meta-data is also used by a primary menu system associated with the application, the primary menu system organizing the application as a hierarchy of application contexts.

8. The computer-readable medium of claim 4, wherein the meta-data is also used by a primary menu system associated with the application, the primary menu system organizing the application as a hierarchy of application contexts.

9. The method of claim 1, wherein the plurality of user-selectable elements are associated with fewer than all of the predefined application views in the target application context.

10. A system for providing navigation within an application, the application comprising a plurality of application contexts, each application context having a predefined set of application views capable of being displayed to a user of the application, the system comprising:
   a memory storage;
   a processing unit coupled to the memory storage and configured to,
      receive a first data input from the user of the application, the first data input corresponding to a first application view selected by the user,
      determine a target application context whose predefined set of application views includes the first application view selected by the user,
      display, prior to displaying the first application view selected by the user, a plurality of user-selectable elements associated with one or more application views in the target application context,
      receive a second data input from the user, the second data input corresponding to a user-selectable element selected by the user and associated with a second application view in the target application context; and
      display, in response to receiving the second data input, the second application view to the user without first displaying the first application view.

11. The system of claim 10, wherein the processing unit is further configured to provide a first user-selectable element prior to receiving the first data input.

12. The system of claim 11, wherein the processing unit is further configured to associate the first data input with the first user-selectable element.

13. The method of claim 10, wherein the processing unit is further configured to use meta-data to determine the target application context whose predefined set of application views includes the first application view selected by the user.

14. The system of claim 13, wherein the meta-data is stored in a database located in the memory storage.

15. The method of claim 14, wherein the database is further configured to store at least one of formatting data for the plurality of application contexts and data to be displayed in the plurality of application contexts.

16. The system of claim 13, wherein the meta-data is also used by the processor for implementing a primary menu system associated with the application, the primary menu system organizing the application as a hierarchy of application contexts.

17. The system of claim 10, wherein the plurality of user-selectable elements are associated with fewer than all of the predefined application views in the target application context.

18. A computer-readable medium containing a set of instructions for execution by a processor, the instructions implementing a method of providing navigation within an application, the application comprising a plurality of application contexts, each application context having a predefined set of application views capable of being displayed to a user of the application, the method comprising:

receiving a first data input from the user of the application, the first data input corresponding to a first application view selected by the user;

determining a target application context whose predefined set of application views includes the first application view selected by the user;

displaying, prior to displaying the first application view selected by the a plurality of selectable elements, associated with one or more application views in the target application context;

receiving a second data input from the user, the second data input corresponding to a user-selectable element selected by the user and associated with a second application view in the target application context; and displaying, in response to receiving the second data input, the second application view to the user without first displaying the first application view.

19. The computer-readable medium of claim 18, further comprising instructions for providing a first user-selectable element prior to receiving the first data input.

20. The computer-readable medium of claim 19, further comprising instructions for associating the first data input with the first user-selectable element.

21. The computer-readable medium of claim 18, further comprising instructions for using meta-data to determine the target application context whose predefined set of application views includes the first application view selected by the user.

22. The computer-readable medium of claim 21, wherein the meta-data is stored in a database.

23. The computer-readable medium of claim 22, wherein the database is further configured to store at least one of formatting data for the plurality of application contexts and data to be displayed in the plurality of application contexts.

24. The computer-readable medium of claim 18, wherein the plurality of user-selectable elements are associated with fewer than all of the predefined application views in the target application context.

* * * * *